US006760910B2

(12) United States Patent
Eilert et al.

(10) Patent No.: US 6,760,910 B2
(45) Date of Patent: *Jul. 6, 2004

(54) WORKLOAD MANAGEMENT METHOD TO ENHANCE SHARED RESOURCE ACCESS IN A MULTISYSTEM ENVIRONMENT

(75) Inventors: Catherine K. Eilert, Wappingers Falls, NY (US); Peter B. Yocom, Wappingers Falls, NY (US); Gary M. King, Millbrook, NY (US); Jeffrey D. Aman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 09/905,236

(22) Filed: Jul. 13, 2001

(65) Prior Publication Data

US 2001/0039559 A1 Nov. 8, 2001

Related U.S. Application Data

(63) Continuation of application No. 08/827,528, filed on Mar. 28, 1997, now abandoned.

(51) Int. Cl.[7] ................................................. G06F 9/00
(52) U.S. Cl. ....................... 718/104; 718/102; 709/223; 709/224; 709/225; 709/226
(58) Field of Search ................................. 709/100, 101, 709/102, 103, 104, 220, 224, 226, 200, 201, 225; 718/100, 102, 103, 104, 1

(56) References Cited

U.S. PATENT DOCUMENTS 3,702,462 A    11/1972  England ................ 340/172.5

4,177,513 A    12/1979  Hoffman et al. ............ 364/200
4,858,108 A     8/1989  Ogawa et al. .............. 364/200

(List continued on next page.)

FOREIGN PATENT DOCUMENTS

JP          07-244629         9/1995

OTHER PUBLICATIONS

C. K. Eilert et al., pending U.S. continuation application Ser. No. 08/848,763, filed May 1, 1997 entitled "Multi–System Resource Capping".

*Primary Examiner*—Majid Banankhah
(74) *Attorney, Agent, or Firm*—William A. Kinnaman, Jr., Esq.; Kevin P. Radigan, Esq.; Heslin Rothenberg Farley & Mesiti P.C.

(57) ABSTRACT

A technique is disclosed for managing a workload distributed across multiple data processing systems to enhance shared resource access to meet a common performance standard. The technique includes on at least one system, measuring performance of the work units on the system to create local performance data, and on at least some of the systems sending the local performance data to at least one other system of the multiple data processing systems. The method further includes on at least one of the systems, receiving the performance data from the sending systems to create remote performance data, and adjusting at least one control parameter for accessing shared resources in response to the local and remote performance data to modify the performance of the work units distributed across the data processing systems to achieve the common performance standard. A dynamic resource clustering process is also employed to enhance the shared resource management.

20 Claims, 12 Drawing Sheets

U.S. PATENT DOCUMENTS

| | | | |
|---|---|---|---|
| 5,008,808 A | 4/1991 | Fries et al. | 364/200 |
| 5,031,089 A | 7/1991 | Liu et al. | 364/200 |
| 5,220,653 A | 6/1993 | Miro | 395/275 |
| 5,301,323 A | 4/1994 | Maeurer et al. | 395/650 |
| 5,379,381 A | 1/1995 | Lamb | 395/275 |
| 5,416,921 A | 5/1995 | Frey et al. | 395/575 |
| 5,421,011 A | 5/1995 | Camillone et al. | 395/650 |
| 5,446,737 A | 8/1995 | Cidon et al. | 370/85.5 |
| 5,452,455 A | 9/1995 | Brown et al. | 395/700 |
| 5,459,864 A | 10/1995 | Brent et al. | 395/650 |
| 5,473,773 A | 12/1995 | Aman et al. | 395/650 |
| 5,504,894 A | 4/1996 | Ferguson et al. | 395/650 |
| 5,507,032 A | 4/1996 | Kimura | 395/826 |
| 5,537,542 A | 7/1996 | Eilert et al. | 395/184.01 |
| 5,603,029 A | 2/1997 | Aman et al. | 395/675 |
| 5,675,739 A | 10/1997 | Eilert et al. | 395/200.11 |
| 5,819,047 A * | 10/1998 | Bauer et al. | 709/104 |
| 5,838,968 A * | 11/1998 | Culbert | 709/104 |
| 5,925,102 A * | 7/1999 | Eilert et al. | 709/226 |
| 5,948,065 A * | 9/1999 | Eilert et al. | 709/226 |
| 6,249,800 B1 | 6/2001 | Aman et al. | 709/105 |
| 6,282,560 B1 * | 8/2001 | Eilert et al. | 709/100 |
| 6,385,639 B1 * | 5/2002 | Togawa | 709/200 |

\* cited by examiner

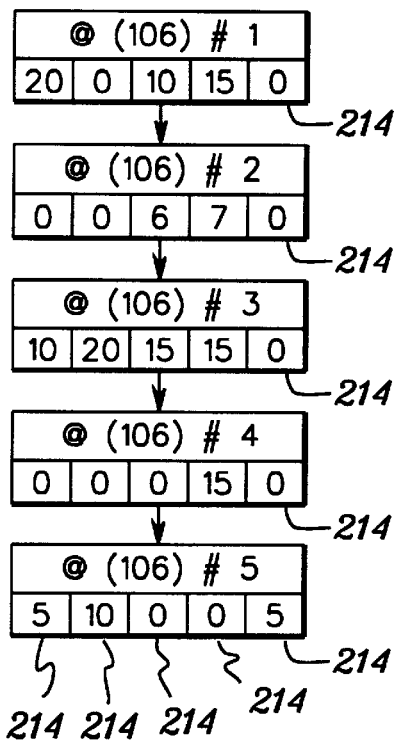
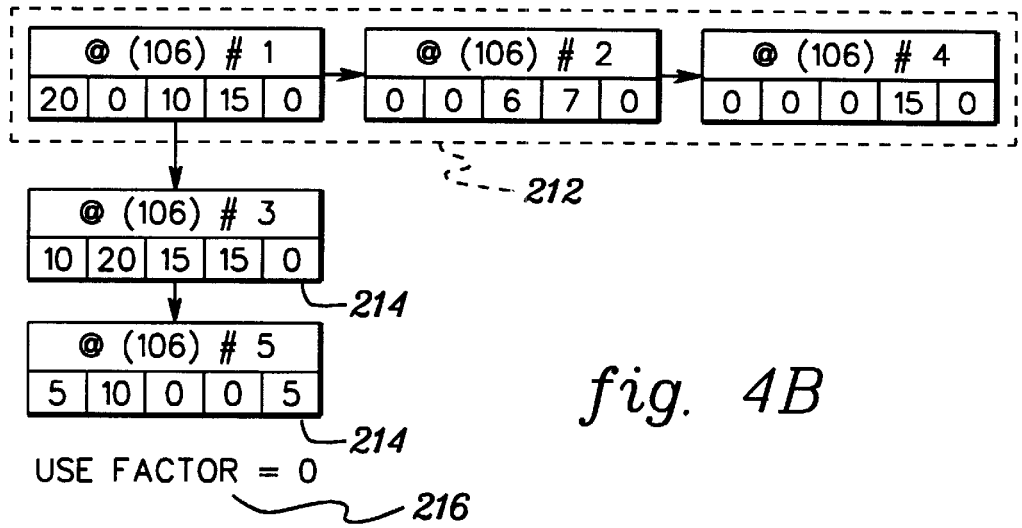
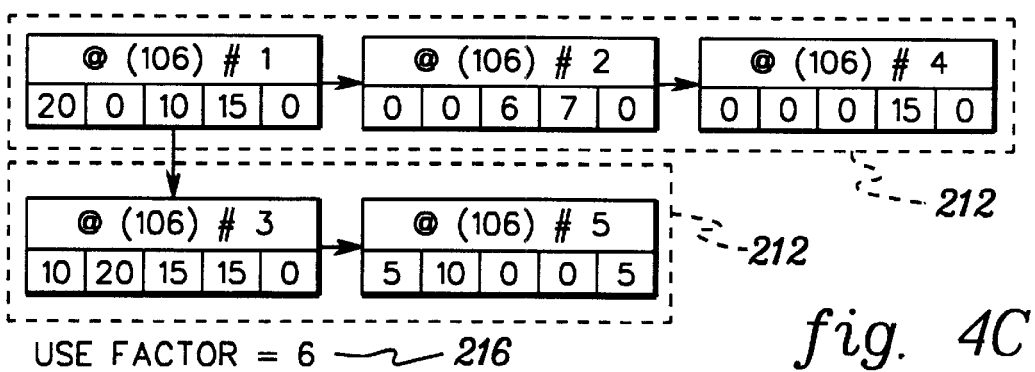
fig. 4A
fig. 4B
fig. 4C

PRIORITY BROADCAST DATA

| CLASS 1 NAME | NEW PRIORITY |
|---|---|
| CLASS 2 NAME | NEW PRIORITY |
| ⋮ | ⋮ |
| CLASS N NAME | NEW PRIORITY |

*fig. 10*

WORKLOAD MANAGEMENT METHOD TO ENHANCE SHARED RESOURCE ACCESS IN A MULTISYSTEM ENVIRONMENT

TECHNICAL FIELD

This invention relates to a method and apparatus for managing resources shared by multiple interconnected, cooperating, independent computer systems to meet performance goals.

BACKGROUND OF THE INVENTION

Workload management is a concept whereby units of work (processes, threads, etc.) that are managed by an operating system are organized into classes (referred to as service classes or goal classes) that are provided system resources in accordance with how well they are meeting predefined goals. Resources are reassigned from a donor class to a receiver class if the improvement in performance of the receiver class resulting from such reassignment exceeds the degradation in performance of the donor class, i.e., there is a net positive effect in performance as determined by predefined performance criteria. Workload management of this type differs from the run-of-the-mill resource management performed by most operating systems in that the assignment of resources is determined not only by its effect on the work units to which the resources are reassigned, but also by its effect on the work units from which they are taken.

Workload managers of this general type are disclosed in the following commonly owned patents and pending patent applications, all of which are incorporated herein by reference:

U.S. Pat. No. 5,504,894 to D. F. Ferguson et al., entitled "Workload Manager for Achieving Transaction Class Response Time Goals in a Multiprocessing System";

U.S. Pat. No. 5,473,773 to J. D. Aman et al., entitled "Apparatus and Method for Managing a Data Processing System Workload According to Two or More Distinct Processing Goals";

U.S. Pat. No. 5,537,542 to C. K. Eilert et al., entitled "Apparatus and Method for Managing a Server Workload According to Client Performance Goals in a Client/Server Data Processing System";

U.S. Pat. No. 5,603,029, to J. D. Aman et al., entitled "System of Assigning Work Requests Based on Classifying into an Eligible Class Where the Criteria is Goal Oriented and Capacity Information is Available";

U.S. Pat. No. 5,675,739 to C. K. Eilert et al., entitled "Apparatus and Method for Managing a Distributed Data Processing System Workload According to a Plurality of Distinct Processing Goal Types";

U.S. application Ser. No. 08/383,042, filed Feb. 3, 1995, of C. K. Eilert et al., entitled "Multi-System Resource Capping", abandoned in favor of a continuation application, Ser. No. 08/848,763, filed May 1, 1997; now U.S. Pat. No. 6,442,583.

U.S. Pat. No. 6,249,800 to J. D, Aman et al., entitled "Apparatus and Accompanying Method for Assigning Session Requests in a Multi-Server Sysplex Environment".

Of these patents and applications, U.S. Pat. Nos. 5,504,894 and 5,473,773 disclose basic workload management systems. U.S. Pat. No. 5,537,542 discloses a particular application of the workload management system of U.S. Pat. No. 5,473,773 to client/server systems. Application Ser. Nos. 08/383,168 and 08/383,042 disclose particular applications of the workload management system of U.S. Pat. No. 5,473,7773 to multiple interconnected systems. U.S. Pat. No. 5,603,029 relates to the assignment of work requests in a multisystem complex ("sysplex"), while application Ser. No. 08/488,374 relates to the assignment of session requests in such a complex.

As a further extension of the workload managers disclosed in the above-incorporated,commonly owned patents and pending patent applications, a mechanism is needed to manage access to resources shared by multiple systems to meet desired performance goals, and as a particular example, to manage input/output (I/O) priorities to meet performance goals. The present invention is directed to providing such a mechanism.

DISCLOSURE OF THE INVENTION

Briefly described, the present invention relates to a method and apparatus for managing workload across a set of interconnected, cooperating, independent computer systems to meet performance goals. A method/apparatus in accordance with this invention manages a workload comprising work units distributed across the plurality of data processing systems in accordance with a common performance standard. Each of the systems has access to a stored representation of the performance standard and performs assigned work units in accordance with one or more control parameters for accessing shared resources. The invention includes: on each of the systems, measuring performance of the work units on that system to create local performance data; on at least some of the systems, sending the local performance data to at least one other system in the plurality of systems; on at least one of the systems, receiving the performance data from at least one other system of the plurality of systems to create remote performance data; and on that at least one system, responding to the local and remote performance data by adjusting at least one of the control parameters for accessing shared resources to modify the performance of the work units on the systems to achieve the common performance standard.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 3b is an enlargement of the delay plot information depicted in FIG. 3a;

FIGS. 4a, 4b & 4c depict an example of cluster determination in accordance with the present invention;

FIG. 10 illustrates storage of IO priority broadcast data.

BEST MODE FOR CARRYING OUT THE INVENTION

In accordance with the principles of the present invention, dynamic management capabilities are provided in which work requests have matching shareable resource access priorities on all computer systems of a multisystem. Use of shareable and non-shared resources is sampled on all operating systems in the multisystem and performance data is employed to dynamically manage shared resource use to achieve multisystem-wide goals, as described below. One example of a computer system incorporating and using the dynamic tracking and management capabilities of the present invention is depicted in FIGS. 1–10, and described in detail below.

The figures illustrate the environment and the key features of the present invention for an exemplary embodiment having three interconnected, cooperating computer systems (100-A, 100-B, 100-C), as members of a multisystem. Those skilled in the art will recognize that any number of such interconnected, cooperating computer systems may be used without departing from the spirit or scope of this invention. The three computer systems are executing a distributed workload, and each is controlled by its own copy of an operating system (101) such as the Multiple Virtual Storage ("MVS") operating system offered by International Business Machines Corporation. This is only one example, however. Other operating systems may be used without departing from the spirit or scope of the present invention.

When the description below refers to the "local" system, it means the computer system (100-A, 100-B, 100-C) that is executing the steps being described, The "remote" systems are all the other computer systems being managed in the multisystem environment. Thus, each computer system considers itself local and all other computer systems remote.

Figure 1:
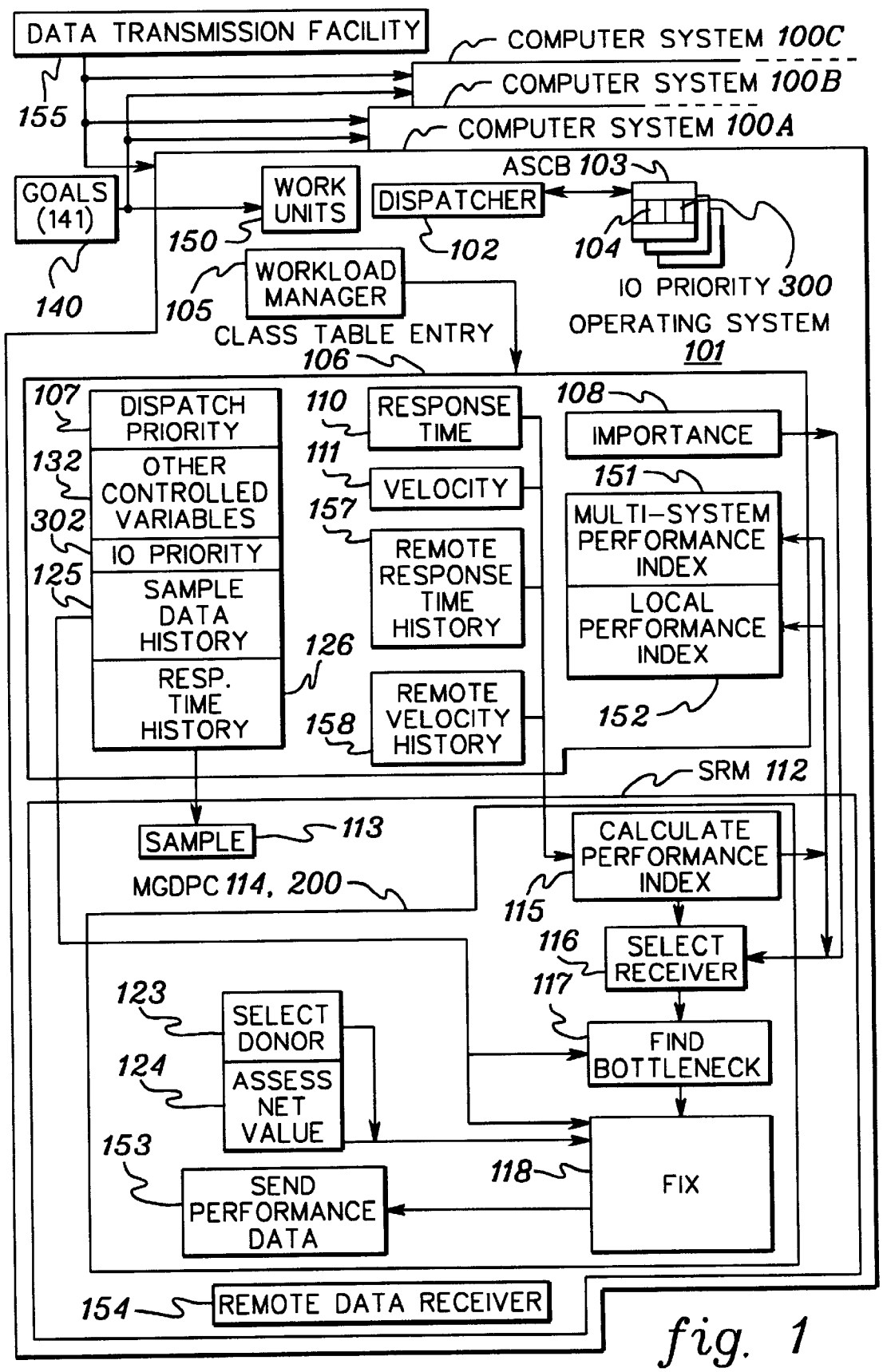
FIG. 1 is a system structure diagram showing a set of computer systems each having a controlling operating system and system resource manager component adapted as described herein in accordance with the present invention.
Figure 2:
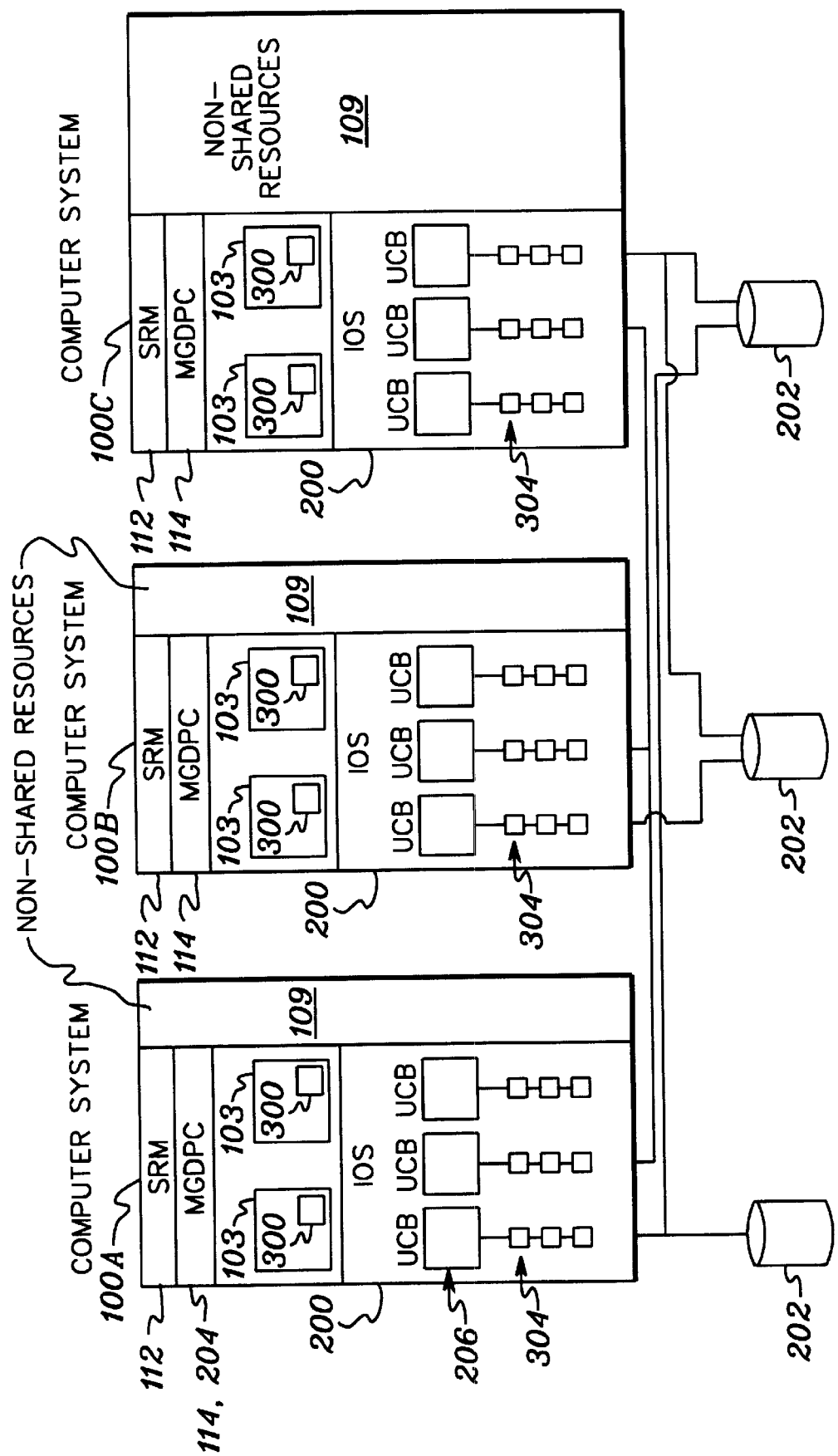
FIG. 2 is a diagram of an exemplary multisystem environment wherein each computer system employs both shared and nonshared resources.

As depicted in FIGS. 1–2, each shareable resource (202) connected to the computer systems has a control subsystem (200) that controls access to the shareable resource. The shareable resources need be neither identical nor shared among each and every one of the computer systems, as in the exemplary case of computer system 100-C. In one embodiment, the shareable resource comprises an input-output (hereinafter "IO") device (202) and an IO subsystem (IOS) (200) that controls access to the IO device. IOS (200) is a component of each operating system (101). IOS processes IO requests (304) for the IO device according to an IO priority (300), in one embodiment of the present invention. IOS includes unit control blocks ("UCB") (206) having the IO requests listed or queued up in order of their IO priorities.

Each computer system also includes non-shared resources (109) and a dispatcher (102) which is a component of the operating system (101) that selects a work unit (150) to be executed next by the computer system (100-A, 100-B, 100-C). IOS (200) itself is a piece of code that must be dispatched by the dispatcher (102) in order for the IOS to run on the processor. In one embodiment, dispatcher (102) dispatches work units (150) to, e.g., a processor (109) according to a dispatch priority (104). Other resource managers control access to other resources.

Work units (150) are the application programs that do the useful work that is the purpose of the computer system (100-A, 100-B, 100-C). The work units can make IO requests (304) to IOS (200) in order to access the IO devices (202). The work units that are ready to be executed are represented by a chain or queue of address space control blocks (hereinafter "ASCB") (103) in the memory of the operating system (101). Each ASCB has a field that contains the dispatch priority (104) and a field that contains the IO priority (300). The dispatch priority (104) is used by the dispatcher (102) to select for execution the highest priority work unit (150) from among those that are ready to be executed.

IO priority (300) is set by operation of the present invention and used by the IOS (200) to select for execution the highest priority IO request (304) from among those that are ready to be executed, that is, that are queued for the IO device (202). The IO priority is a controlled variable provided and managed by the present invention for meeting the stated performance goals (141) for operation of the computer systems, as members of the multisystem.

The present invention takes as input the goals (141) established by a multisystem administrator and stored on a data storage facility (140) accessible by each computer system being managed. The goals apply to work across all the computer systems (100-A, 100-B, 100-C) being dynamically managed. In accordance with the present invention, access to both the processor (109) and the IO devices (202) by the work units (150) is determined by how well the work units are achieving their goals. Included in each of the goals is a specification of the relative importance (108) of the goal. On each of the computer systems being managed, a workload manager (hereinafter "WLM") (105) on the operating system (101) reads the goals (141) into the computer system. Each of the goals causes the WLM on each computer system to establish a work class to which the individual work units (150) will be assigned.

When a work unit (150) executes, shows up, or starts running on any one of the computer systems (100-A, 100-B, 100-C), for example, in response to a user logging into or submitting a batch job to the particular computer system, the work unit is assigned to a work class. Then, the performance of that particular work unit factors into whether or not the particular work class is meeting the goals (141) of the work class.

In one exemplary embodiment, the goals (141) are illustrated as performance goals of two types: response time (110) (in seconds) and execution velocity (111) (in percent). Those skilled in the art will recognize that other goals, or additional goals, may be chosen without departing from the spirit or scope of this invention. Each work class is represented in the memory of the operating system by a class table entry (106). In the exemplary embodiment, the work class for each performance goal takes the form of a performance work class. Accordingly, each performance work class is represented in the memory of the operating system (101) by one of the class table entries.

FIG. 1 depicts the class table entry (106) records (in an internal representation) the specified goals (141) and other information relating to the performance work class. Other information stored in the class table entry includes the relative importance (108) (an input value) for the goal, the dispatch priority (107) (a controlled variable), IO priority (302) (a controlled variable), other controlled variables (132), the multisystem performance index (151) (computed value), the local performance index (152) (computed value), the response time goal (110) (an input value), the execution velocity goal (111) (an input value), the remote response time history (157) (measured data), the remote velocity history (158) (measured data), the sample data history (125) (measured -data), and the response time history (126) (measured data).

The goal-driven performance controller of the system resource manager (hereinafter "SRM") (112) of operating system (101) performs sampling (113) and includes a multisystem goal-driven performance-controller (hereinafter "MGDPC") (114). The MGDPC performs the functions of measuring the achievement of the goals (141), selecting the performance work classes that need their performance improved, and improving the performance of the performance work classes by modifying the appropriate controlled variables (107, 302, 132) of the associated work units (150). In the preferred embodiment, the functioning of the MGDPC (114) is performed periodically, based on expiration of a timer.

In MGDPC (114), as depicted in FIG. 1, at "Calculate Performance Index" (115) a multisystem performance index (151) and a local performance index (152) are calculated for each class table entry (106), using the specified type of goal (110, 111). The multisystem performance index represents the performance of work units (150) associated with the work class across all the computer systems being managed. Also, the local performance index represents the performance of the work units associated with the work class on the local system. The resulting performance indexes are recorded in the corresponding class table entry (106) at (151) and (152). The concept of using a performance index as a method of measuring performance goal achievement is well-known.

At "Select Receiver" (116), a performance class is selected to receive a performance improvement in the order of the relative importance (108) of the goal (141) and the current value of the performance indexes (151, 152). The performance class so selected is referred to as the receiver class or receiver. The MGDPC (114) first uses the multisystem system performance index (151) when choosing a receiver so its action has the largest possible impact on causing work units (150) to meet the goals across all the computer systems (100-A, 100-B, 100-C) being managed. When there is no action to take based on the multisystem performance index, the local performance index (152) is used to select a receiver that will most help the local system meet its goals. With respect to the resources (109, 202) (FIG. 2), MGDPC (114) performs additional checks, as described below.

At "Find Bottleneck" (117), state data is used to select resource bottlenecks to address. For each delay type, the class table entry (106) contains the number of samples encountering that delay type and a flag indicating whether the delay type has already been selected as a bottleneck during the present invocation of the MGDPC (114). The selection of a bottleneck to address is made by selecting the delay type with the largest number of samples that has not already been selected during the present invocation of the MGDPC. When a delay type is selected, the flag is set so that delay type is skipped if "Find Bottleneck" (117) is reinvoked during this invocation of the MGDPC. The type with the largest number of delay samples is located. The flag is set for the particular type and the particular type is returned. This invention adds IO Delay as a bottleneck to be addressed.

At "Fix" (118), the potential changes to the controlled variables (107, 302, 132) are considered. A performance work class is selected (123) for which a performance decrease can be made based on the relative goal importance (108) and the current value of the performance indexes (151, 152). The performance work class thus selected is referred to as the donor. Next, the proposed changes are assessed (124) for net value relative to the expected changes to the multisystem and local performance indexes for both the receiver and the donor class or donor for all the potentially changed controlled variables, including the IO priority (302) and the variables mentioned above and incorporated in copending application Ser. No. 08/383,166, filed Feb. 3, 1995, now U.S. Pat. No. 5,675,739. A proposed change has net value if the result would yield more improvement for the receiver than harm to the donor relative to the goals. If the proposed change has net value, then the respective controlled variable is adjusted for both the donor and the receiver.

Changes to IO priorities (300) of the IO requests (304) of the work units (150) must propagate across all computer systems (100-A, 100-B, 100-C). For example, if work class A is running with IO priority two hundred fifty-three on one computer system, it must run with IO priority of two hundred fifty-three on all the computer systems in order to maintain this priority. Inconsistently maintained IO priorities would mean changes to the IO priorities could yield unpredictable effects. Any shared resource (202) (FIG. 2) would have similar requirements to keep the controlled variable in sync.

Each computer system (100-A, 100-B, 100-C) to be managed is connected to a data transmission mechanism (155) that allows the computer system to send data records to every other computer system. At (153) a data record describing the recent performance of each work class is sent to every other computer system. This concept is further described in the above-referenced and incorporated copending application Ser. No. 08/383,168, filed Feb. 3, 1995, now U.S. No. 5,575,739 entitled "Apparatus And Method For Managing a Distributed Data Processing System Workload According to a Plurality of Distinct Processing Goal Type".

The MGDPC (114) (FIG. 1) function is performed periodically (once every ten seconds in a preferred embodiment) and is invoked via timer expiration. The functioning of the MGDPC provides a feedback loop for the incremental detection and correction of performance problems so as to make the operating system (101) adaptive and self-tuning.

The present invention coordinates across the multisystem changes to the IO priorities (300). In one preferred embodiment, after the MGDPC (114) (FIG. 1) on any computer system makes changes to the IO priorities, a further change to IO priorities will not be made for a number of time intervals. For example, such intervals could be six intervals, each interval being of ten seconds duration. These intervals serve to control the frequency of IO priority changes, to encourage each MGDPC to work on other matters, and to give enough time for feedback on the earlier changes to the priorities. This serialization with respect to IO priority changes is discussed further below and depicted in FIG. 9.

At (154), a remote data receiver receives performance data from remote systems asynchronously. The received data is placed in remote performance data histories (157, 158) for later processing by the MGDPC (114).

Figure 3A:
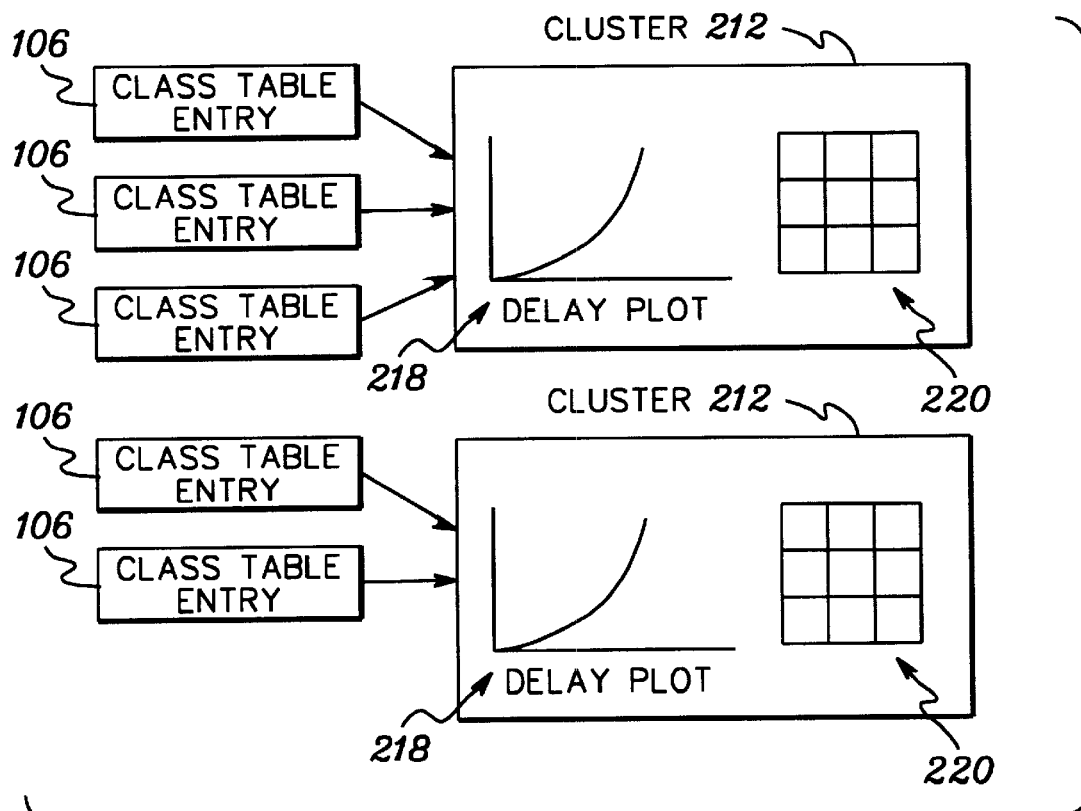
FIG. 3a is a representation of cluster information stored by each computer system of the multisystem in accordance with the present invention.

As depicted for computer system 100-A (FIG. 2), at any particular time only one MGDPC (114) may serve as a coordinating, grouping, and/or "clustering system" (204). As depicted in FIG. 3a and shown in phantom in FIGS. 4b–4c, this one "clustering system" determines disjoint sets or clusters (212) with respect to the IO devices (202) (FIG. 2).

Clustering system (204) represents special functioning of the MGDPC (114) to handle complexities involved in prioritizing use of IO devices (202) in the multisystem. Usually, not all work units (150) use the same IO devices. So, for the MGDPC to affect performance of the work units (150) using IO devices by changing IO priorities (300) of receivers with respect to donors, the MGDPC must know whether a certain donor actually affects the particular receiver. For example, if class 1 uses IO devices A, B, and C and class 2 uses IO devices X, Y, and Z, then changing the IO priority of class 1 will not affect the performance of class 2.

Conceptually, a "cluster" (212) (FIG. 3a) is a set of work classes competing for use of the same set, or subsets of the same set, of IO devices (202). Accordingly, MGDPC (114) can ascertain that work classes A and B use the IO devices of a first cluster and that work classes C, D, and E use the IO devices of a second cluster. Preferably, clustering system (204) dynamically builds these clustered relationships of work classes and IO devices periodically, for example, every ten minutes, based on how the clustering system sees use of the IO devices by the work classes.

Again, clustering system (204) determines the clusters (212) of IO devices (202). The remote data receiver (154) for the clustering system asynchronously receives data for the work classes from the remote systems. From this data, the clustering system is able to determine the clusters that are used by each work class in the multisystem, as discussed below.

The information about what IO devices (202) (FIG. 2) each work class is using can be gathered by sampling. Sampling builds a list for each work class that contains information about each IO device that work units (150) (FIG. 1) in the work class are using or waiting to use. The elements in the list are device use list elements (DULE). Each DULE contains a number identifying the IO device and the number of times the work units in the work class were seen using or waiting to use the IO device.

Every minute, each non-clustering system, for example, computer systems (100-B, 100-C) illustrated in FIG. 2, will send the DULEs for each work class to the clustering system (204). The non-clustering systems know which system is the clustering system through the system name in a device clustering control table (hereinafter "DCCT") on each computer system. The clustering system will add the DULEs it receives to its work class DULE lists. This way, the IO device use lists on the clustering system represent how work units (150) (FIG. 1) in each work class are using IO devices across the entire multisystem.

Preferably every ten minutes, the clustering system consolidates the samples from each computer system to generate the clusters (212) (FIG. 3a) of the IO devices (202) (FIG. 2). The clustering system broadcasts these clusters to every other computer system in the multisystem. Thus, each computer system has the same information on multisystem topology as it makes priority decisions affecting every other computer system in the multisystem. The clustering interval of ten minutes stems from an assumption of fairly stable use of the IO devices.

In one preferred embodiment, only one MGDPC (114) at a time serves as the clustering system (204), which forms the clusters (212) (FIG. 3a) that every MGDPC consults when considering potential changes with respect to the IO priority (300) for IO requests (304) of work units (150). The illustrated embodiment depicts an instance of computer system (100-A) including the operating system (101) providing service in the form of clustering system (204). As a variation, the operating system of each computer system (100-A, 100-B, 100-C) might be capable of being designated as the clustering system.

The computer system that acquires an exclusive lock or clustering latch serves as the single clustering system in the multisystem at any given moment. Further, the DCCT contains a bit signalling whether the local system is the clustering system and an indication, as appropriate, of any remote clustering system. In an alternative embodiment, the capability to serve as the clustering system (204) can be omitted from MGDPC (200) for one or more of the operating systems (101).

Figure 5A:
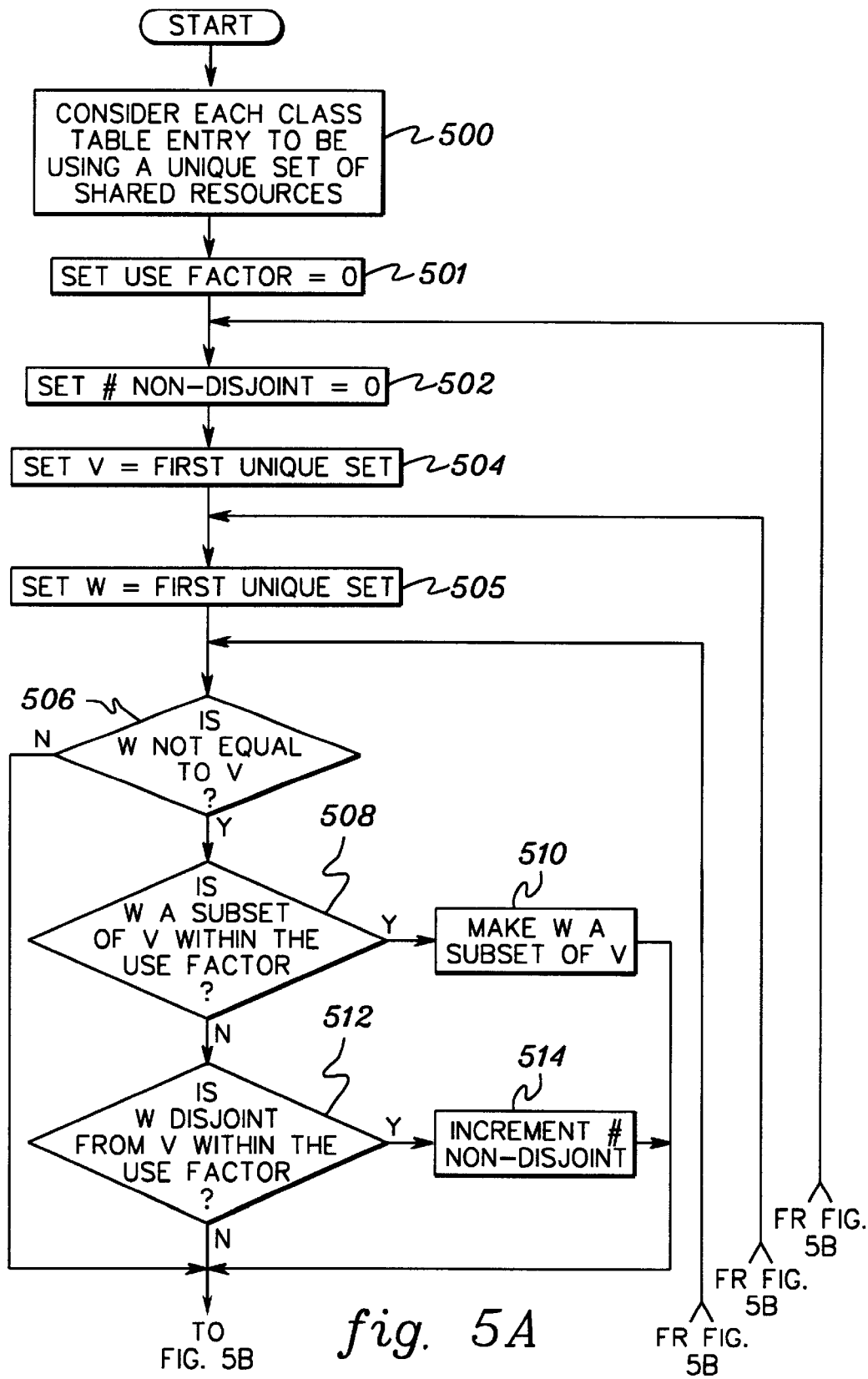
FIGS. 5A & 5B are a flowchart of one process for constructing clusters in accordance with one aspect of the shared resource management of the present invention.
Figure 5B:
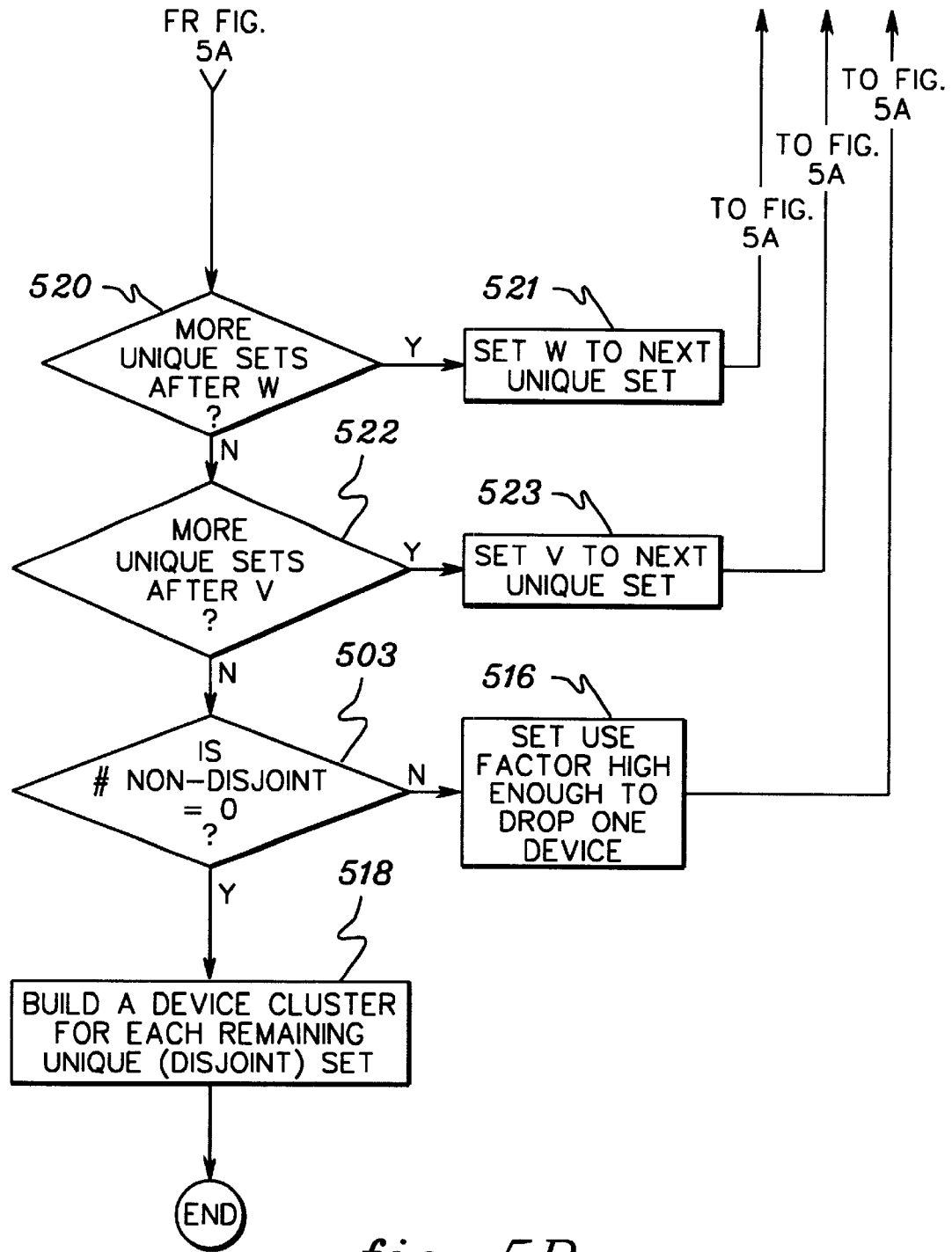

By way of further explanation, clustering system (204) (FIG. 2) executes the logic depicted in FIGS. 5a & 5b to form clusters (212) (FIG. 3a). One can understand the steps of the logic through examination of their application in the example of FIGS. 4a–4c. As mentioned above and depicted in FIG. 1, each work class is represented in the memory of the operating system (101) by a class table entry (106). In the example of FIGS. 4a–4c, each class table entry (106) (FIG. 1) stores representations of use (214) for each of five IO devices (202), only three of which are depicted in FIG. 2.

At STEP (500), each class table entry (106) is initially considered to be using a unique set of IO devices (202) (FIG. 2). The use factor (216) is reset, for instance, to zero at STEP (501). At STEP (502), an internal counter of the number of non-disjoint sets of IO devices between the work classes is set to zero. Work classes are purely disjoint when neither work class has a non-zero representation of use (214) of an IO device (202) (FIG. 2) for which the other work class also has a non-zero representation of use. The clustering system can also interpret or consider work classes disjoint by ignoring a certain conflicting representation of use (214). As discussed further below, if a pair of work classes would be purely disjoint but for use by only one work class of the pair of a certain IO device, evaluation of this use with respect to a use factor (216) determines whether the pair will nonetheless be interpreted as disjoint.

INQUIRY (503) represents a logical flow valve in an instance of the well-known DO-UNTIL loop computer programming structure. At INQUIRY (503), the clustering system (204) (FIG. 2) logically evaluates whether to return logical progression for looping through STEP (502) or exit the DO-UNTIL logical structure. The clustering system executes the logic interposed between STEP (502) and INQUIRY (503) until it considers all work classes not yet folded into subsets of the other work classes to be disjoint.

At INQUIRY (504), the logic ensures examination of each work class represented by a class table entry (106) (FIG. 1). By STEPS and INQUIRIES (504–506, 508, 510, 512, 514, 520–523), the clustering system (204) (FIG. 2) considers any additional remaining work class in relation to the subject work class. As illustrated, clustering in accordance with the present invention is an iterative process. What were initiated as unique work classes are thoroughly scrutinized for folding into other work classes as subsets.

At STEP (510), if the additional work class is a pure subset of, and therefore purely non-disjoint with respect to, the subject work class, then the subset is formed. Therefore, this pair of work classes will share the same cluster (212) (FIG. 3a). Furthermore, the class table entry (106) for that additional work class preferably points to the subject work class as its parent or root in the cluster under construction. Accordingly, FIG. 4b depicts what were initiated as the second and fourth unique work classes as now non-unique subsets of the first developing cluster root work class because their respective representations of use (214) of the IO devices demonstrate they are subsets of such use by the first work class, STEP (510). Namely, commonality exists with respect to slots in their class table entries indicating their representations of use.

At INQUIRY and STEPS (512, 514, 516), the logic bolsters and solidifies the above-discussed premise of INQUIRY (503) of continued looping through (502) until the clustering system (204) (FIG. 2) considers all work classes to be disjoint not folded into subsets of the other work classes. FIG. 4c depicts the use factor (216) increased to the value of six in order to discount the representation of use (214) of five listed for the IO device (202) (FIG. 2) corresponding to the final slot of IO devices in the last class table entry (106) (FIG. 1). The work class corresponding to this last class table entry is then considered to be a subset of its preceding work class, into whom it is folded as a subset to develop a second cluster (212). In one embodiment, the illustrated logic can be modified so that after the use factor has been increased to the value of six, all the remaining unfolded sets are considered disjoint and interpreted as clusters. In any event, the clustering system at STEP (518) develops into clusters the sets of the IO devices of all remaining, unfolded work classes.

Figure 3B:
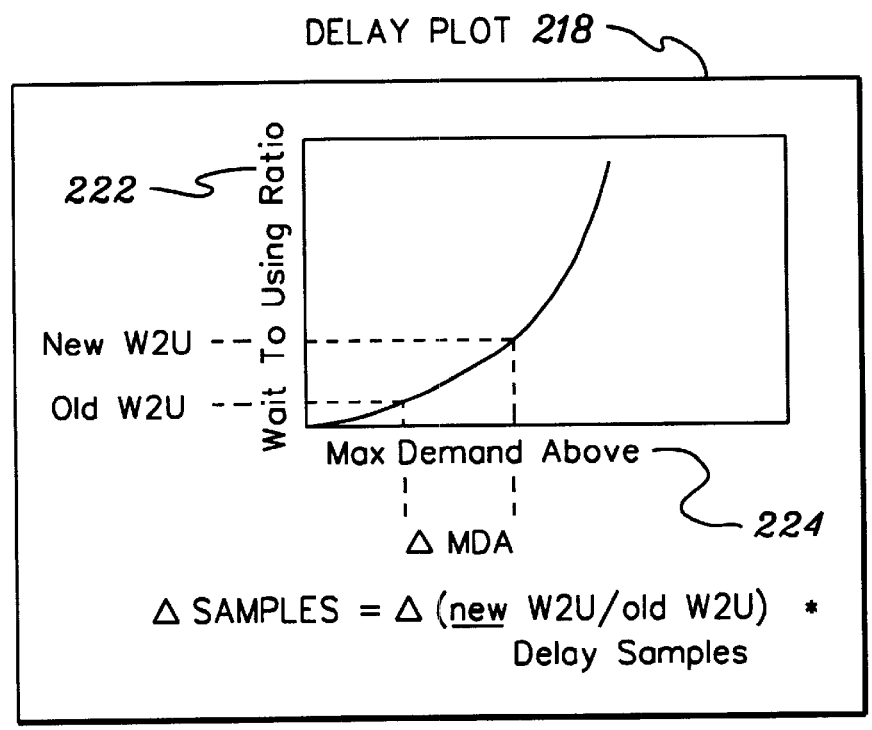

As depicted in FIGS. 3a–3b, the new clusters include a delay plot (218) copied from a cluster created in the previous clustering interval (if there was a previous interval), and having common use of the largest number of IO devices (202) (FIG. 2). The idea behind this procedure is to find for each new cluster a cluster most like it from the preceding clustering interval for use as a source in initializing the delay plot of the new cluster.

The delay plot plots wait-to-using ratio (222) versus maximum demand (224) and is used at "Fix" (118) (FIG. 1). In particular, the delay plot contains relatively long-term information that is used to project the effect of changing IO priorities (300) (FIG. 1) for the work units (150) (FIG. 1) of the work classes associated with the IO devices (202) (FIG. 2) of particular clusters. Initialization by copying of a previous delay plot, as mentioned above, advantageously leverages the relatively long-term character of the information. In one embodiment, every ten minutes this initialization occurs on the clustering System (204) (FIG. 2) after its broadcasting (STEPS (908, 917) (FIGS. 6a & 6b)) of the new clusters to all the other computer systems. Further, each of these other computer systems perform their own such initialization upon receipt of the new clusters.

The procedure for choosing the most similar preceding cluster ranks all the old clusters by number of samples collected for work classes common to the new cluster and each old cluster. Then, the procedure selects the old cluster having highest resulting rank for use as the source in initializing the delay plot (218) of the new cluster.

Improving performance by reducing the IO delay experienced by the receiver is next discussed.

Figure 6A:
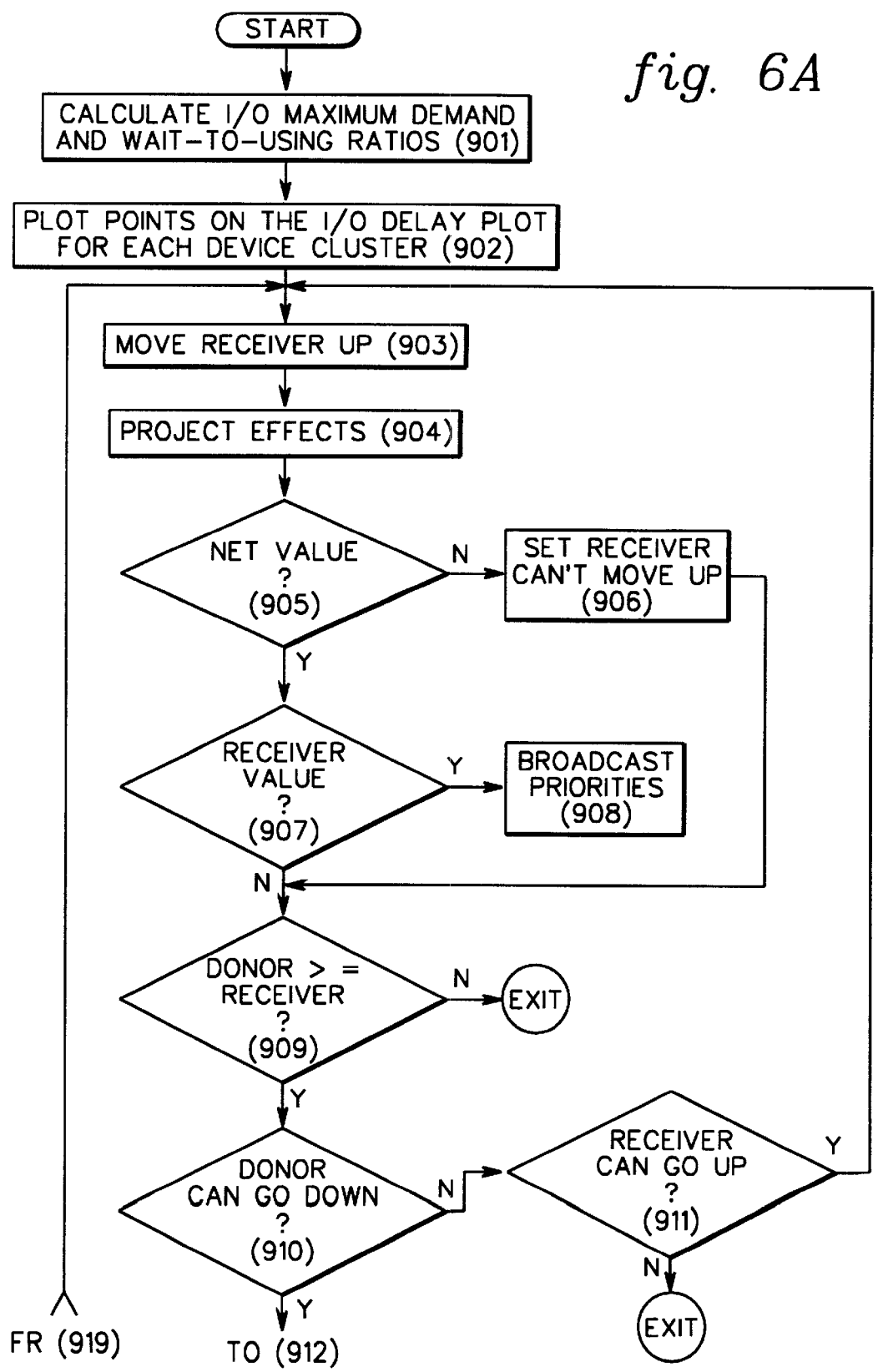
FIGS. 6a & 6b are a flowchart for assessing improving performance by adjusting shared resource priority.
Figure 6B:
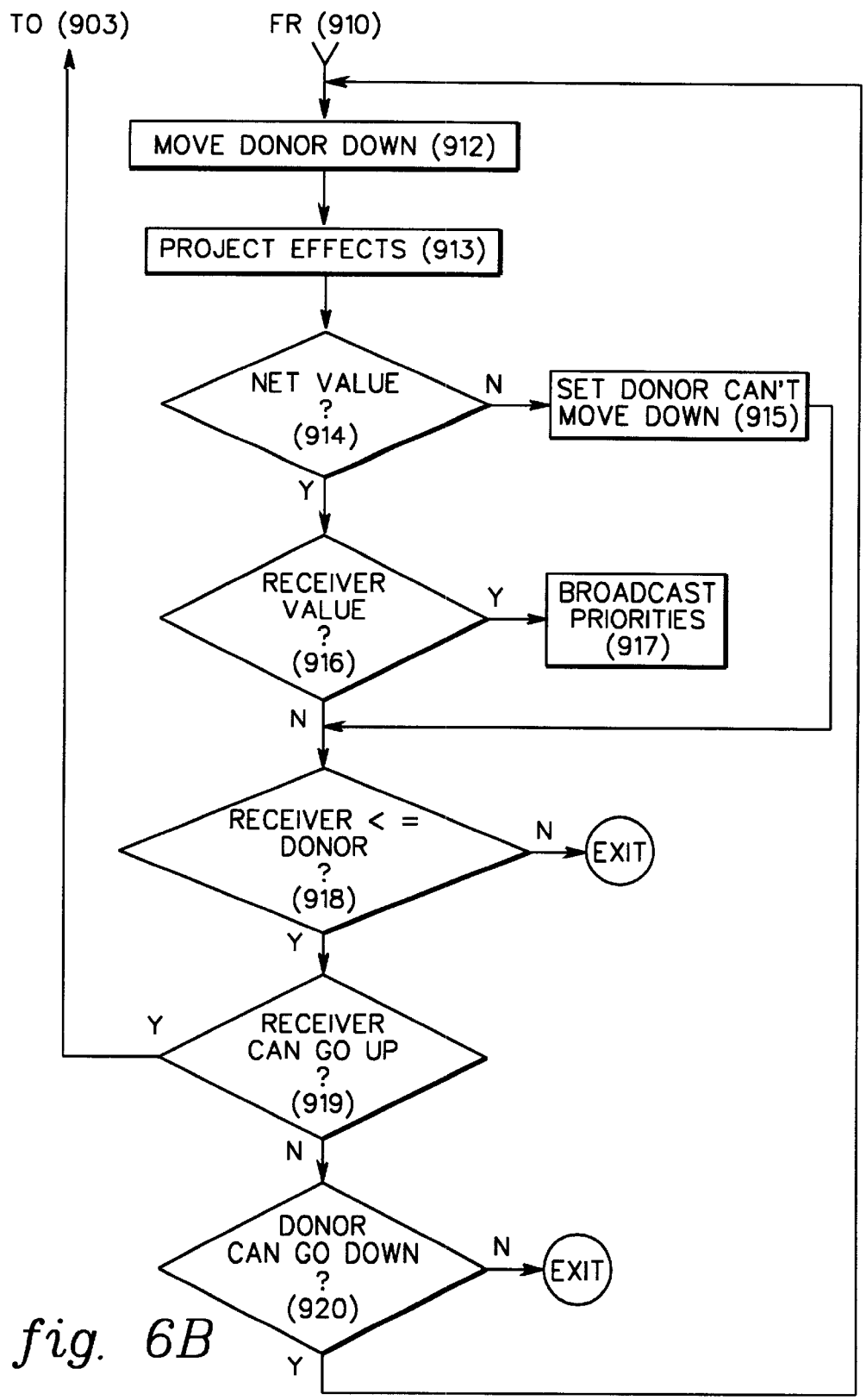
Figure 8:
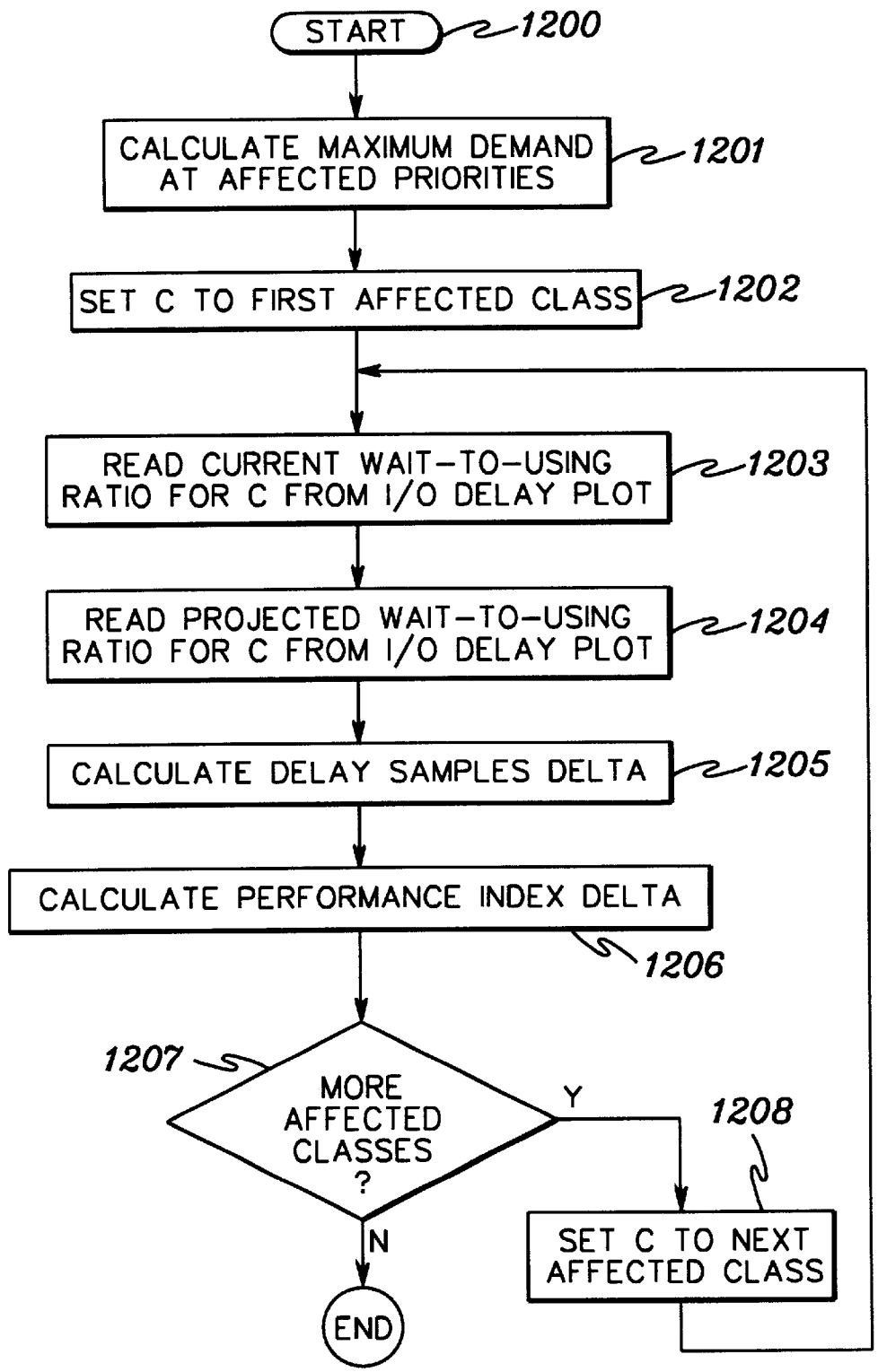
FIG. 8 illustrates the steps to project the effects of changing IO priorities.
Figure 9:
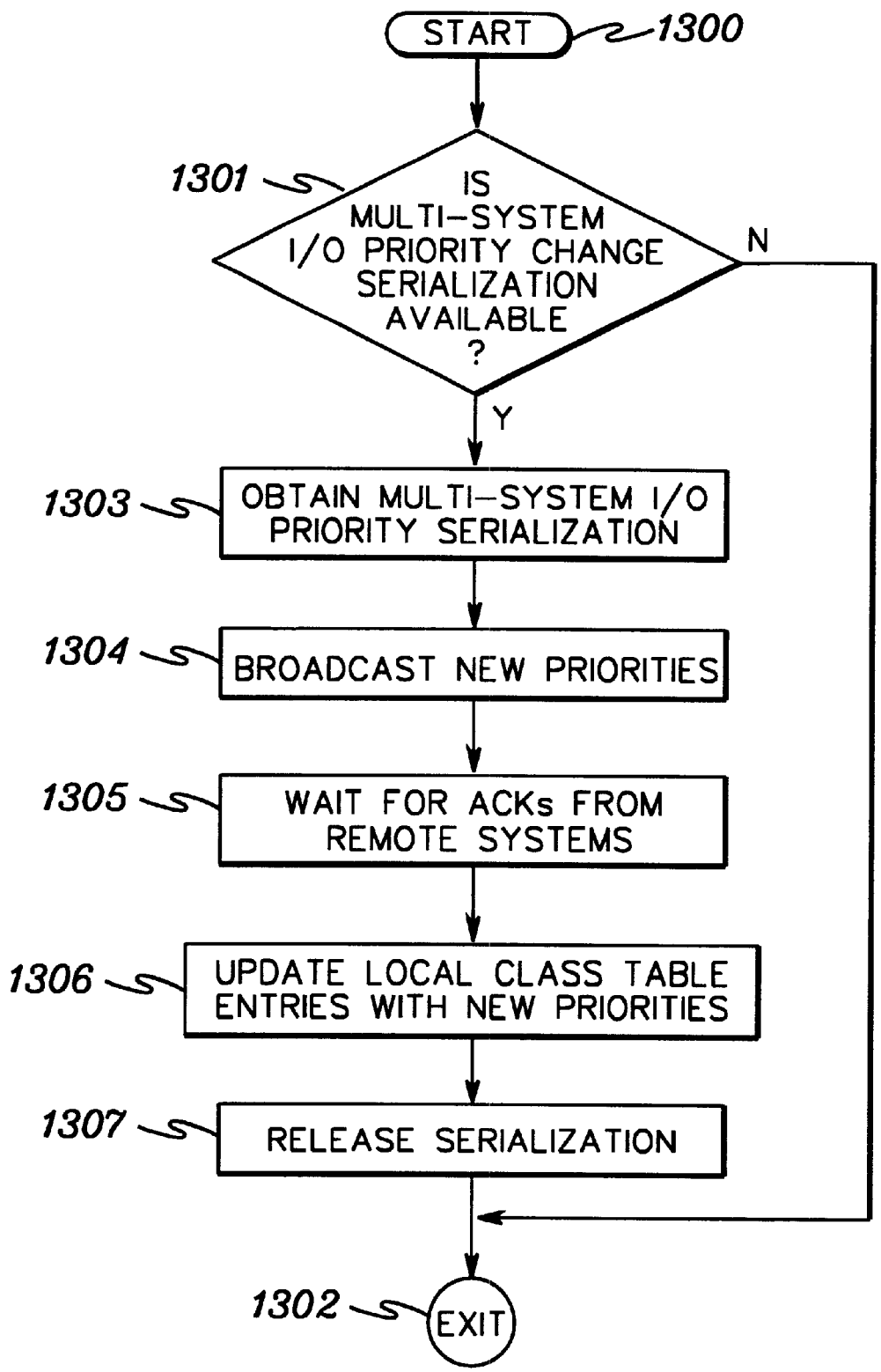
FIG. 9 is a flowchart of serialization for creating and broadcasting new IO priorities.

FIGS. 6a–6b illustrate a process to find a new set of IO priorities (300) (FIG. 1) to be used to improve the receiver's performance without inequitably harming the donor's performance. FIG. 8 provides the steps involved in making the performance index delta projections provided by fix (118) (FIG. 1) to assess net value (124) (FIG. 1). Once a new set of IO priorities has been found, the new priorities must be sent to all the other systems. FIGS. 9–10 describe this broadcast process.

Referring to FIGS. 6a & 6b, the maximum demand (224) (FIG. 3b) and wait-to-using ratio (222) (FIG. 3b) are calculated at STEP (901) for each work class and accumulated for all the work classes at each IO priority. These calculations are described below. A wait-to-using table (220) (FIG. 3a) of these values is constructed for each cluster (212) (FIG. 3a) where each row represents the IO priority (300) (FIG. 1) and the two columns are the IO wait-to-using ratio and the I/O maximum demand, accumulated for all the performance work classes in the cluster at the corresponding IO priority. The wait-to-using table is used to project new IO wait-to-use values for a new IO priority, as described below. The maximum demand and wait-to-using ratio are multi-system values, in accordance with the present invention. The formula for maximum demand is:

I/O maximum demand percentage=(number of work units)×(multi-system I/O-using samples)×(100) (multisystem total samples)−(multisystem I/O delay samples)

Maximum demand is the theoretical maximum percentage of time a work class can use the IO devices if it has no IO delay. The formula for wait-to-using is:

I/O wait-to-ratio=multisystem I/O delay samples*16 multisystem I/O using samples Another concept used in accessing IO priority changes is cumulative maximum demand. The cumulative maximum demand for an IO priority P is the sum of the IO maximum demands for all the work classes in a cluster having an IO priority greater than or equal to P.

The delay plot of FIG. 3b is used to predict the effect on the wait-to-using ratio of a work class when the IO priority of the work class is changed. The delay plot captures the relationship between cumulative IO maximum demand and IO wait-to-using ratio. There is one IO delay plot for each cluster (212) (FIG. 3a). The abscissa (X) is cumulative IO maximum demand and the ordinate (Y) value is IO wait-to-using ratio. At STEP (902) data is plotted on the delay plot for each cluster.

Figure 7:
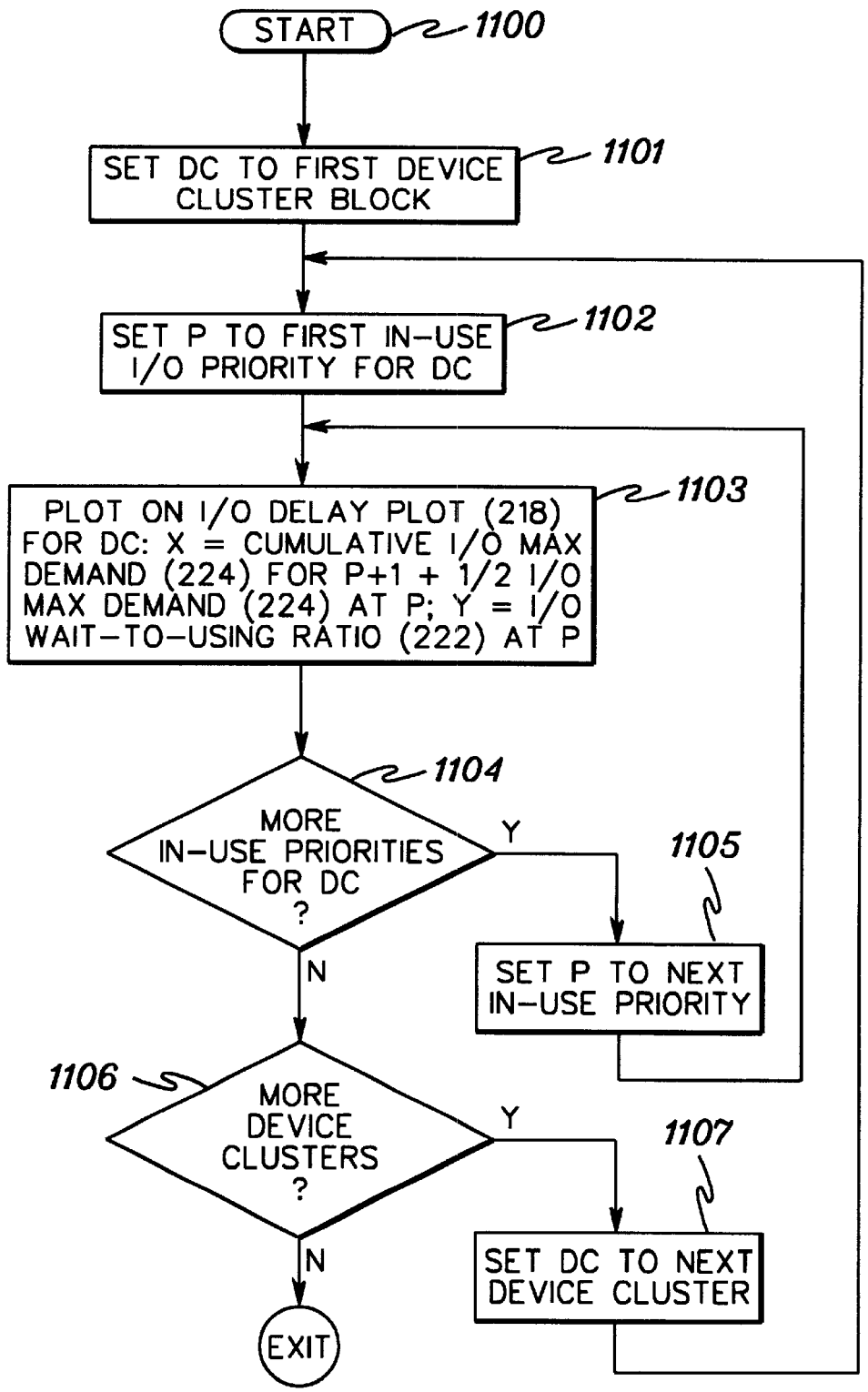
FIG. 7 is a flowchart for creating the delay plot of FIGS. 3a & 3b.

FIG. 7 shows the steps to plot data on this delay plot. One point is plotted on the delay plot for a cluster for each priority that is in-use for the cluster. A priority is considered in-use for a cluster if there is a work class within the cluster that has that IO priority (300) (FIG. 1). Data for the point is taken from the row in the wait-to-using table (220) (FIG. 3a) corresponding to the IO priority. The abscissa (X) value for a priority P is the cumulative IO maximum demand for priority P+1 plus half the IO maximum demand for priority P (224) (FIG. 3b). The reason that only half of the IO maximum demand at priority P is included in the abscissa value is that a class at priority P will be more delayed by work with an IO priority greater than P than other work with an equal IO priority. Work with an IO priority greater than P get access to IO devices (202) (FIG. 2) before work at priority P while competing work at the same IO priority get equal access to IO devices. The ordinate value for priority P is the IO waiting-to-using ratio (222) (FIG. 3b) for work at priority P.

As illustrated in FIGS. 6a–6b, STEPS and INQUIRIES (903–910) alternately assess increasing the IO priority (300) (FIG. 1) of the receiver (moving the receiver up) and decreasing the IO priority of the donor (moving the donor down) until the combination of moves produces sufficient receiver value or insufficient net value, "Assess Net Value" (124) (FIG. 1). STEPS (904, 913) project the effects of a move. Upon a finding of sufficient receiver value (INQUIRIES (907, 916)), the new IO priorities are broadcast to the other computer systems, STEPS (908, 917). In the event of failure of either net value check (INQUIRIES (905, 914)), secondary donors and receivers are selected to be moved up with the receiver or down with the donor for determination of whether that combination of moves will pass the net value check.

If the combination of moves passes the net value check (INQUIRIES (905, 914)), those secondary receivers and donors are moved along with the primary receiver and donors. The secondary donors and receivers are not found via the select donor means and the select receiver means; instead, secondary receivers are defined as those work classes in the same cluster (212) (FIG. 3a) as the primary receiver: 1) having an IO priority (300) (FIG. 1) below the IO priority of the primary receiver; and 2) that failed the net value check. Analogously, secondary donors are those work classes in the same cluster as the primary donor; 1) having an IO priority above the IO priority of the primary donor; and 2) that failed the net value check.

FIG. 8 illustrates the steps to project the effects of changing IO priorities. At (1201), the IO maximum demand of the performance work class whose IO priority is to be changed is subtracted from its "from" (current) IO priority and added to its "to" (proposed) IO priority. Next, the projected change in delay samples is calculated for each affected work class as follows. First (1203), the current IO wait-to-using ratio for an affected class's priority is read from the IO delay plot. At (1204), the projected IO wait-to-using ratio for the class's new priority is read from the delay plot (218) (FIG. 3b) based on the cumulative maximum demand after the priority change. At (1205) the projected delay samples are calculated with the formula:

(projected delay samples)=(actual delay samples)×(projected wait-to-using) (current wait-to-using)

The projected delay samples are equal to the actual observed delay samples times the projected wait-to-using ratio divided by the current wait-to-using ratio. The delay sample delta is equal to the projected samples minus the actual samples.

At (1206) performance index deltas are calculated for IO priority changes as shown below. Note: these equations go both ways for receivers and donors because the IO delay sample deltas are signed numbers.

Response time goals:

(projected multisystem response time delta)–(delay samples delta)×(actual multisystem response time) (multisystem non-idle samples)

(projected multisystem performance index delta)=(projected multisystem time delta) (goal)

Execution velocity goals (new multisystem velocity)=(multisystem CPU-using)+(multisystem I/O using) (multisystem non-idle samples)+(delay samples delta)

(multisystem performance index delta)=(current multisystem performance index)–(velocity goal) (new multisystem velocity)

One difference between IO priorities and the other resources managed by the MGDPC (114) (FIG. 1) is that IO priorities are for a multisystem resource. A given performance work class must have the same IO priority on each computer system (100-A, 100-B, 100-C). Therefore, when one system makes a change to IO priorities it must inform all the other computer systems.

FIG. 9 shows the steps in the process. At (1301), the computer system making the IO priority change attempts to get serialization to stop any other systems from making IO priority changes. If serialization is not available (1302), another computer system is in the process of making IO priority changes and the local computer system discards its proposed IO priority changes. If the serialization is available, the local computer system obtains the serialization (1303). At (1304), the local computer system broadcasts the new priorities to every other computer system.

FIG. 10 shows the data broadcast. This data is a simple table with one entry for each performance work class. This entry contains the name of the work class and the new IO priority of that work class. As depicted in FIG. 9, at (1305), the computer system waits to receive acknowledgments from each remote computer system that the remote computer system has received and implemented the new IO priorities. At (1306), the local computer system updates each of its class table entries (106) (FIG. 1) with its new IO priority (302) (FIG. 1). At (1307), the local computer system releases the serialization to allow other computer systems to make changes to IO priority. When each remote computer system receives new IO priorities, the receiving computer system updates each of its performance work class table entries with the new IO priority. The receiving computer system sends acknowledgment to the computer system making the IO priority changes that it has received the new IO priorities.

The flow diagrams depicted and described herein above are merely exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Further, the present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of dynamically tracking use by a plurality of work classes of a plurality of resources in a multisystem, wherein each work class comprises at least one work unit, the method comprising:

employing a system resource manager to dynamically form a plurality of sets of shareable resources from at least some shareable resources of the plurality of resources while the plurality of work classes are using the plurality of resources; and employing the system resource manager to dynamically associate each work class of at least some work classes of the plurality of work classes with a set of shareable resources of the sets of shareable resources based upon resources currently employed by the at least one work unit of said work class.

2. The method of claim 1, wherein said employing the system resource manager to dynamically form the plurality of sets of shareable resources includes employing the system resource manager to dynamically observe usage of each shareable resource of said at least some shareable resources and determine a respective representation of use of each shareable resource of said at least some shareable resources for each work class of said at least some work classes, and employing said representations of use in said dynamic forming of said sets of shareable resources.

3. The method of claim 2, wherein said determining of said representations of use executes after a relative event.

4. The method of claim 2, wherein said associating of each work class of said at least some work classes with said one set of shareable resources employs said dynamically determined representations of use.

5. The method of claim 1, wherein said associating executes when said one set of shareable resources includes all shareable resources used by that work class.

6. The method of claim 1, further comprising determining a respective representation of use of each shareable resource of said at least some shareable resources for each work class of said at least some work classes; and wherein said associating employs the respective representations of use for each work class of said at least some work classes.

7. The method of claim 1, further comprising determining a respective representation of use of each shareable resource of said at least some shareable resources for each work class of said at least some work classes; and wherein said associating comprises interpreting said respective representations of use for each work class of the at least some work classes for which none of said sets of shareable resources includes all shareable resources used by that work class.

8. The method of claim 7, wherein said interpreting comprises identifying a most common set of shareable resources of said sets of shareable resources with respect to said respective representations of use by each work class of said at least some work classes.

9. The method of claim 8, wherein said interpreting comprises:

identifying a least used member of said most common set of shareable resources with respect to said respective representations of use by each work class of said at least some work classes; and evaluating whether to ignore said least used member.

10. The method of claim 9, wherein said evaluating includes valuing a variable between upper and lower limits for comparison with a representation of use of said least used member.

11. Apparatus for dynamically tracking use by a plurality of work classes of a plurality of resources in a multisystem, wherein each work class comprises at least one work unit, the apparatus comprising:

means for employing a system resource manager to dynamically form a plurality of sets of shareable resources from at least some shareable resources of the plurality of resources while the plurality of work classes are using the plurality of resources; and means for employing the system resource manager to dynamically associate each work class of at least some work classes of the plurality of work classes with a set of shareable resources of the sets of shareable resources based upon resources currently employed by the at least one work unit of said work class.

12. The apparatus of claim 11, wherein the means for employing the system resource manager to dynamically form the plurality of sets of shareable resources includes means for employing the system resource manager to dynamically observe usage of each shareable resource of said at least some shareable resources and determine a respective representation of use of each shareable resource of said at least some shareable resources for each work class of said at least some work classes, and employing said representations of use in said dynamic forming of said sets of shareable resources.

13. The apparatus of claim 12, wherein said means for determining said representations of use executes after a relative event.

14. The apparatus of claim 12, wherein said means for associating each work class of said at least some work classes with said one set of shareable resources employs said dynamically determined representations of use.

15. The apparatus of claim 11, wherein said means for associating executes when said one set of shareable resources includes all shareable resources used by that work class.

16. The apparatus of claim 11, further comprising means for determining a respective representation of use of each shareable resource of said at least some shareable resources for each work class of said at least some work classes; and wherein said means for associating employs the respective representations of use for each work class of said at least some work classes.

17. The apparatus of claim 11, further comprising means for determining a respective representation of use of each shareable resource of said at least some shareable resources for each work class of said at least some work classes; and wherein said means for associating comprises means for interpreting said respective representations of use for each work class of the at least some work classes for which none of said sets of shareable resources includes all shareable resources used by that work class.

18. The apparatus of claim 17, wherein said means for interpreting comprises means for identifying a most common set of shareable resources of said sets of shareable resources with respect to said respective representations of use by each work class of said at least some work classes.

19. The apparatus of claim 18, wherein said means for interpreting comprises:

means for identifying a least used member of said most common set of shareable resources with respect to said respective representations of use by each work class of said at least some work classes; and means for evaluating whether to ignore said least used member.

20. The apparatus of claim 19, wherein said means for evaluating includes means for valuing a variable between upper and lower limits for comparison with a representation of use of said least used member.

* * * * *

UNITED STATES PATENT AND TRADEMARK OFFICE
CERTIFICATE OF CORRECTION

PATENT NO. : 6,760,910 B2
DATED : July 6, 2004
INVENTOR(S) : Eilert et al.

It is certified that error appears in the above-identified patent and that said Letters Patent is hereby corrected as shown below:

<u>Column 6,</u>
Line 13, delete "08/383,166" and insert -- 08/383,168 --

Signed and Sealed this

Seventh Day of September, 2004

JON W. DUDAS
*Director of the United States Patent and Trademark Office*